US007536249B2

(12) United States Patent
Müller

(10) Patent No.: US 7,536,249 B2
(45) Date of Patent: May 19, 2009

(54) SYSTEM AND METHOD FOR A PUMPING TORQUE ESTIMATION MODEL FOR ALL AIR INDUCTION CONFIGURATIONS

(75) Inventor: Martin Müller, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/948,271

(22) Filed: Nov. 30, 2007

(65) Prior Publication Data

US 2009/0018748 A1 Jan. 15, 2009

Related U.S. Application Data

(60) Provisional application No. 60/949,269, filed on Jul. 12, 2007.

(51) Int. Cl.
*G06F 19/00* (2006.01)
*F02D 41/12* (2006.01)

(52) U.S. Cl. ...................................................... 701/102

(58) Field of Classification Search ................. 701/102, 701/110, 54; 123/325, 399
See application file for complete search history.

(56) References Cited

U.S. PATENT DOCUMENTS

| | | | |
|---|---|---|---|
| 6,367,462 | B1 | 4/2002 | McKay et al. |
| 6,393,903 | B1 | 5/2002 | Reed et al. |
| 7,085,647 | B1 | 8/2006 | Prucka et al. |
| 7,127,346 | B1 | 10/2006 | Trombley et al. |

FOREIGN PATENT DOCUMENTS

| | | | |
|---|---|---|---|
| FR | 2 877 045 | A1 * | 4/2006 |
| WO | WO 2006/045972 | A2 * | 5/2006 |

OTHER PUBLICATIONS

SAE Technical Paper Series 2000-01-1221, "Design and Development of a Mechanical Variable Valve Actuation System," Ronald J. Pierik and James F. Burkhard, Delphi Automotive Systems, SAE 2000 World Congress, Detroit, Michigan, Mar. 6-9, 2000.

* cited by examiner

*Primary Examiner*—Hieu T Vo
(74) *Attorney, Agent, or Firm*—Paul L. Marshall

(57) ABSTRACT

A system and method for controlling an engine involves providing a pumping torque estimation model. The model distinguishes between pumping losses due to throttling and pumping losses due to valve flow losses. The model is implemented by a pair of look-up tables. The data in each look-up table reflect Pumping Mean Effective Pressure (PMEP), which is indicative of the pumping work. The throttling loss table provides a first contribution based on an engine delta pressure. The valve flow loss table provides a second contribution based on an engine speed and a relative airload. The first and second contributions are summed and then multiplied by a predetermined factor to convert the pumping work (PMEP) into pumping torque. The model will work with naturally-aspirated, turbo-charged and super-charged air induction configurations and provides improved altitude compensation. The model will also work with both spark-ignition and compression-ignition configurations.

14 Claims, 3 Drawing Sheets

SYSTEM AND METHOD FOR A PUMPING TORQUE ESTIMATION MODEL FOR ALL AIR INDUCTION CONFIGURATIONS

RELATED APPLICATIONS

This application claims the benefit of U.S. provisional application Ser. No. 60/949,269 filed Jul. 12, 2007 entitled PUMPING TORQUE ESTIMATION MODEL FOR ALL AIR INDUCTION CONFIGURATIONS AND VOLUMETRIC EFFICIENCY MODEL FOR ALL AIR INDUCTION CONFIGURATIONS, owned by the common assignee of the present invention and herein incorporated by reference in its entirety.

TECHNICAL FIELD

The present invention relates to a system and method for a pumping torque estimation model suitable for use with all air configurations (e.g., naturally-aspirated, turbo-charged, and super-charged) and all combustion types (i.e., spark ignition and compression ignition).

BACKGROUND OF THE INVENTION

It is known that in an internal combustion engine, engine pumping work is used to draw the combustion charge of fuel and air into the combustion chamber (cylinder) and to exhaust the burned gas from the cylinder. Accordingly, the net torque that is available to be delivered to the powertrain is arrived at by reducing the total torque produced by the engine by the pumping torque (as well as being reduced by other factors such as friction losses, etc.). These calculation are typically performed by an electronic controller or the like in an engine control system using a pumping torque model. Conventional pumping torque models, for a naturally aspirated engine, typically use as a load dependency the engine delta pressure since this is widely thought to describe one of the major contributors to pumping losses, namely throttling loss. The engine delta pressure is typically defined as the exhaust pressure ($P_{exh}$) minus the intake pressure ($P_{int}$). Conventionally, the pumping torque model is implemented in the form of a calibration look-up table developed for a particular engine configuration. The look-up table provides an estimated value for the pumping torque based on the engine speed and the engine delta pressure.

However, for a turbo-charged engine with an active waste-gate, the conventional pumping torque model is inadequate. Specifically, the engine delta pressure does not change monotonically with engine load for a turbo-charged engine. Accordingly, such a model cannot be used for air induction configurations other than naturally-aspirated engines.

There is therefore a need for a system and method for providing a pumping torque estimation model that minimizes or eliminates one or more of the problems set forth above.

SUMMARY OF THE INVENTION

The present invention is directed to a system and method for determining a pumping torque for an internal combustion engine that has a pumping torque (loss) estimation model that will work with any one of a number of air induction configurations (e.g., naturally-aspirated (NA), turbo-charged (TC), super-charged (SC) and comparable air induction configurations). The invention recognizes that the total pumping loss requires making a distinction between throttling loss contributions, on the one hand, and valve flow loss contributions, on the other hand. This distinction is not only physically more correct, but also solves the non-monotonicity problem described in the Background. Additionally, the invention ensures proper altitude compensation.

The method includes a number of steps. The first step involves determining an engine speed, an engine delta pressure and an engine relative airload. The next step involves calculating a first contribution based on the engine delta pressure using first predetermined data. The first contribution corresponds to the throttling loss. The next step involves calculating a second contribution based on the engine speed and the relative airload using second predetermined data. The second contribution corresponds to valve flow loss. Finally, the last step involves determining a pumping torque (loss) based on the first and second contributions. In an alternate embodiment, a method of controlling an internal combustion engine is provided, and which includes a further step of controlling the engine based on the now-estimated pumping torque.

The first and second contributions are expressed in pumping mean effective pressure (PMEP) values (e.g., kPa), and the step of determining the pumping torque involves multiplying the sum of the first and second contributions (PMEP) by a predetermined conversion factor.

A method is also presented for producing a pair of calibration look-up tables containing the first predetermined data (throttling loss) and the second predetermined data (valve flow loss).

Other features, object and advantages of the present invention are also presented.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
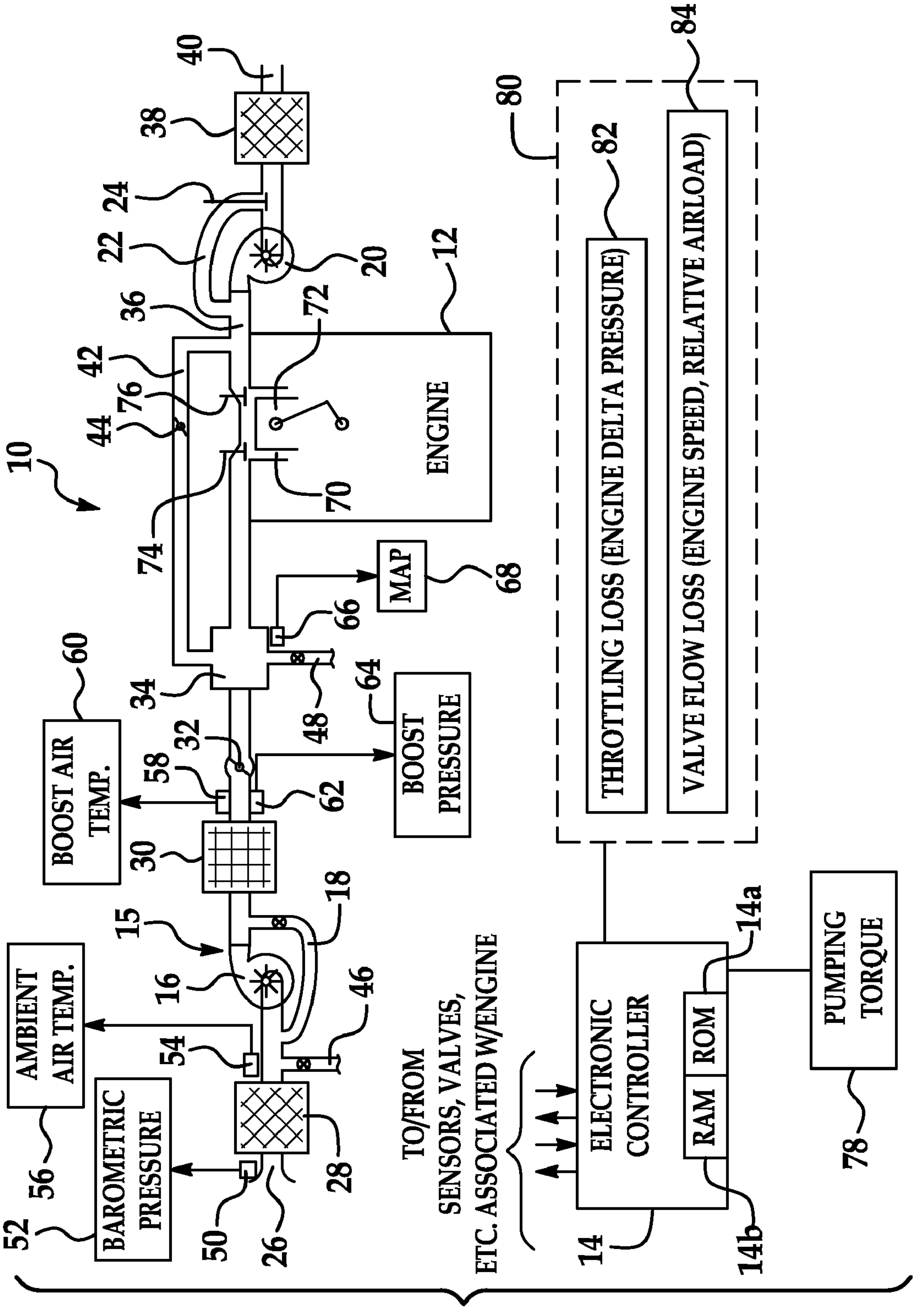
FIG. 1 is simplified diagrammatic and block diagram of a turbo-charged engine system having a controller configured for modeling pumping torque according to the invention.

Referring now to the drawings wherein like reference numerals are used to identify identical components in the various views, FIG. 1 is a diagrammatic view of a turbo-charged internal combustion engine system 10 configured in accordance with the present invention. The system 10 includes an internal combustion engine 12 controlled by an electronic engine controller 14. Engine 12 may be a spark-ignition engine that includes a number of base engine components, sensing devices, output systems and devices, and a control system. Alternatively, the present invention may be used with compression-ignition engines, such as diesel or the like.

Generally, electronic controller 14 is configured via suitable programming to contain various software algorithms and calibrations, electrically connected and responsive to a plurality of engine and vehicle sensors, and operably connected to a plurality of output devices. Controller 14 includes at least one microprocessor or other processing unit, associated memory devices such as read only memory (ROM) 14*a* and random access memory (RAM) 14*b*, input devices for monitoring input from external analog and digital devices, and output drivers for controlling output devices. In general, controller 14 is operable to monitor engine operating conditions and operator inputs using the plurality of sensors, and control engine operations with the plurality of output systems and actuators, using pre-established algorithms and calibrations that integrate information from monitored conditions and inputs. The software algorithms and calibrations which are executed in electronic controller 14 may generally comprise conventional strategies known to those of ordinary skill in the art. The software algorithms and calibrations are preferably embodied in pre-programmed data stored for use by controller 14. Overall, in response to the various inputs the controller 14 develops the necessary outputs to control the throttle, fuel, spark, EGR and other aspects, all as known in the art.

System 10 further includes, in the illustrated embodiment, a turbo-charger 15 having a compressor 16, which may include a compressor recirculation path 18, and an exhaust gas driven turbine 20, which includes a parallel waste-gate flow path 22. As known, the compressor is driven by the turbine, and the amount of boost is controlled principally by a waste-gate control mechanism (e.g., valve) shown schematically as a waste-gate valve 24. The present invention, however, is not limited to a turbo-charged engine embodiment, and is applicable to all air induction configurations, namely, naturally-aspirated (NA), turbo-charged (TC), supercharged (SC) engine configurations, and other comparable air induction configurations now known or hereafter developed.

On the air intake side of the engine 12, FIG. 1 shows an air intake port 26, an air filter 28, an intercooler 30 configured to cooperate with and complement compressor 16, a throttle valve 32, and an intake manifold 34. These features are well known and understood in the art. These features may comprise conventional implementations.

On the exhaust side of the engine 12, FIG. 1 shows an exhaust gas manifold 36. Additionally, various downstream exhaust components are conventionally included in system 10, such as a catalytic converter and a muffler, and are shown schematically as a single exhaust restriction block 38, which feeds into exhaust gas outlet 40. These features are well known and understood in the art. These features may comprise conventional implementations.

Conventionally, a variety of feedback paths are provided in system 10. For example, FIG. 1 shows an exhaust gas recirculation (EGR) tube or the like coupled between the exhaust manifold 36 and the intake manifold 34, and whose flow path is adjusted by way of an EGR valve 44. As known, the EGR valve 44 may be controlled by the electronic controller 14 in accordance with conventional EGR algorithms configured to achieve predetermined performance criteria. Generally, varying the position of the valve 44 alters the amount of exhaust gas that is provided to the intake manifold 34 for mixing with intake air, fuel and the like destined for combustion in engine 12.

With continued reference to FIG. 1, additional feeds may also be provided. For example, evaporative emissions control and diagnostics generally call for an evaporative ("evap") emissions canister (not shown) be provided in an automotive vehicle that includes system 10. The evap canister is coupled to a fuel tank (not shown) as well as to inlets 46 and 48 by a combination of vent, purge and check valves, all as known in the art.

FIG. 1 also shows a variety of sensors deployed on the intake side of the engine 12, including an ambient or barometric pressure sensor 50 configured to produce a barometric pressure signal 52, an ambient air temperature sensor such as an intake air temperature (IAT) sensor 54 configured to generate an IAT signal 56, a boost air temperature sensor 58 configured to generate a boost air temperature signal 60, a boost pressure sensor 62 configured to generate a boost pressure signal 64, and an intake manifold pressure sensor such as a manifold absolute pressure (MAP) sensor 66 configured to generate a MAP signal 68. These sensors and their functioning are all well known and understood in the art. These sensors may all comprise conventional components.

Additionally, system 10 includes capabilities for determining a value for the mass air flow $\dot{m}_c$, which may be obtained either via measurement by an air meter (e.g., mass air flow sensor or MAF sensor-not shown ) typically placed just upstream of the compressor 16, or, in an alternate embodiment, calculated by the well known speed-density equation, for example as set forth in U.S. Pat. No. 6,393,903 entitled VOLUMETRIC EFFICIENCY COMPENSATION FOR DUAL INDEPENDENT CONTINUOUSLY VARIABLE CAM PHASING to Reed et al., assigned to the common assignee of the present invention, and incorporated herein by reference in its entirety.

Additionally, the engine 12 typically includes a plurality of cylinders 70, one of which is shown (side view) in FIG. 1. In very general terms, a respective piston 72 is disposed in each cylinder 70, as known, and is arranged to reciprocate therein, imparting a torque for rotation of a crankshaft (not shown). As the piston 72 reciprocates within cylinder 70 in accord with a 4-stroke cycle, a fresh air and fuel charge is drawn into the combustion cylinder during an intake stroke through an intake valve(s) 74 and is exhausted during an exhaust stroke through an exhaust valve(s) 76. As further known, work (pumping work) is required to draw in the air/fuel charge and to exhaust the burned gas. This work is lost practically speaking and reduces the torque delivered to the crankshaft (the available torque). The controller 14 is configured to make this calculation (estimated pumping torque), which is shown in pumping torque block form as block 78. The controller 14 is configured to take the estimated pumping torque 78 (and other calculated losses) into account when calculating the available torque, and by extension, when, controlling the engine system 10 so as to produce a requested or desired torque.

The controller 14 is configured to use a pumping torque estimation model 80 which characterizes the pumping torque for all air induction configurations under a wide engine operating range. The model 80 is embodied as a pair of look-up tables: (1) a first look-up table 82 containing first predetermined data that provides a first contribution, as a function of the engine delta pressure ($P_{exh}-P_{int}$), corresponding to a throttling loss; and (2) a second look-up table 84 containing second predetermined data that provides a second contribution, as a function of engine speed and relative engine airload, corresponding to a valve flow loss. Generally, the pumping torque 78 may be calculated based on the first and second contributions (e.g., by adding them together, then converting to pumping torque). The next section of this specification will describe a method of using this new pumping torque model for estimating a pumping torque value, and using this value in the control of the engine, and will thereafter describe a method for producing the data contained in the pair of look-up tables 82, 84.

Figure 2:
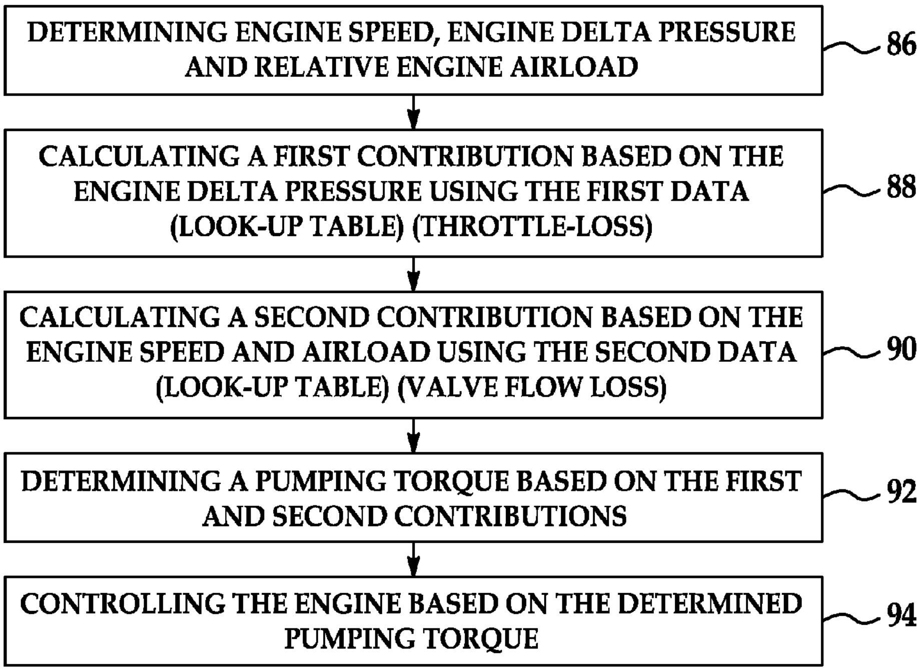
FIG. 2 is a flowchart showing a method of controlling an engine which involves determining a pumping torque according to the estimation model of the invention.

FIG. 2 is a flow chart diagram illustrating the method of estimating a pumping torque and controlling the engine. The method begins in step 86, where the controller 14 first determines engine speed, engine delta pressure and relative airload. The engine speed parameter is typically available within a conventional engine management system (EMS) of controller 14, such as, for example, by way of data obtained from a crankshaft position sensor or the like. The engine delta pressure is typically calculated by determining the difference between the intake ($P_{int}$) and exhaust ($P_{exh}$) pressures ($P_{exh}-P_{int}$). The intake pressure ($P_{int}$) may be obtained from the MAP signal 68. The known art contains many strategies for determining an exhaust pressure ($P_{exh}$) for the various air induction configurations. The relative airload is the percentage of the present engine mass airflow taken relative to the air mass flowed at wide-open-throttle (WOT) and at predetermined reference conditions. The airload parameter may be determined according to equation (1):

$$AIRLOAD = \frac{cylairmass}{refcylairmass} \tag{1}$$

where the reference cylinder air mass is determined at a predetermined volumetric efficiency (VE), such as VE=100%, at a WOT condition, for example, where MAP is taken to be 101.3 kPa, and at a predetermined reference temperature, such as 20 deg. C. The present cylinder air mass (i.e., the numerator in equation (1)) may be determined either through a mass air flow (MAF) sensor, if present (as described above) or through evaluation of the well-known speed-density equation. The method then proceeds to step 88.

In step 88, the controller 14 calculates a first contribution based on the engine delta pressure using the first predetermined data contained in the first look up table 82. The first data contained in the look-up table 82 is, in one embodiment, expressed in terms of Pumping Mean Effective Pressure (PMEP), for example in units of kPa. The PMEP correlates to the pumping work. One advantage of using PMEP is that is scales all engines to the same reference. More particularly, using PMEP is advantageous since it avoids range dependence on engine size. Additionally, using PMEP allows reuse of calibrations for early stage development work/calibration program. The method then proceeds to step 90.

In step 90, the controller 14 calculates a second contribution based on the engine speed and airload using the second predetermined data contained in the second look up table 84. The second predetermined data contained in the look-up table 84 is, in one embodiment, also expressed in terms of PMEP (units of kPa). The method then proceeds to step 92.

In step 92, the controller 14 determines an estimated pumping torque based on the first and second contributions. To complete this step, the controller 14 determines an aggregate contribution, i.e., the sum of the first and second contributions (PMEP). Then, the controller 14 converts the aggregate contribution into an estimated pumping torque via equation (2):

$$PumpingTorque = AggregateContributions(PMEP) * ConversionFactor \tag{2}$$

where the $$ConversionFactor = \frac{Veng}{4 * \pi} \tag{3}$$

and $V_{eng}$ is the total volume displacement of the engine.

In step 94, the controller 14, in a preferred embodiment, uses the estimated pumping torque to control the operation of the engine 12. As described above, one way the estimated pumping torque may be used by the controller 14 is in determining an available torque. Those of skill in the art will appreciate other uses of the pumping torque parameter.

As alluded to above, a method for producing the data contained in the look-up tables 82, 84, will also be described. However, before proceeding to this description, a more detailed treatment of the technical aspects involved is believed to be beneficial and thus warranted.

For a naturally-aspirated engine, it was established that the engine delta pressure ($P_{exh}-P_{int}$) provides a good parameter upon which to estimate the pumping work (loss) incurred by the engine. In a turbo-charged engine, at low engine speeds, the engine delta pressure ($P_{exh}-P_{int}$) parameter and the measured pumping work (i.e., PMEP) behave, even in the turbo-charged engine, like a naturally-aspirated engine, with both parameters decreasing linearly with increasing load. However, for medium and high engine speeds, which are characterized by significant boost capability of the turbo, the engine pressure delta ($P_{exh}-P_{int}$) no longer decreases monotonically with increasing load, and the increase in PMEP at high boost and flow rates is significant. To restate the problem, this means that conventional pumping torque estimation models based solely on ($P_{exh}-P_{int}$) will not work, e.g., for a turbo-charged engine. The reason that the engine delta pressure ($P_{exh}-P_{int}$) exhibits this behavior (i.e., non-monotonicity) for a turbo-charged engine is as follows.

Figure 3:
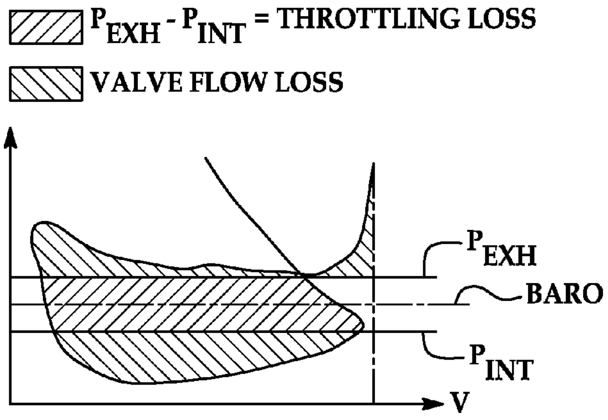
FIG. 3 is a simplified pumping loop diagram showing the allocation of throttling loss and valve flow loss that make up the total pumping loss.

Initially, note that pumping work—the parameter to be estimated—is composed of both throttling work and valve flow work, as illustrated in the PV diagram of FIG. 3. In comparing naturally-aspirated and turbo-charged engines, the following observations can be made.

In a naturally aspirated engine at low engine speeds, the intake throttling loss dominates the total pumping loss because the flow rates are relatively small. Therefore, pumping work drops linearly with increasing load, i.e., as ($P_{exh}-P_{int}$)→0. This is also true on a turbo-charged engine since low speed operation is very similar to a naturally aspirated engine due to limited boost capability.

In a naturally-aspirated engine a high engine speeds, the valve flow loss dominates. Therefore, even though the throttling loss decreases with increasing load, i.e., ($P_{exh}-P_{int}$)→0, this is more than off-set by the increase in valve flow loss due to the high flow rates, and the overall trend is an increase in the total pumping work with increasing load.

In a naturally-aspirated engine at medium engine speeds, there is a transition from the intake throttling loss dominating the total pumping loss, to the valve flow loss dominating. The result is that there is very little combined pumping work that is dependent on the load (flat lines).

In a turbo-charged engine, however there is an additional phenomena, namely exhaust throttling loss. For medium and high engine speeds, the boost capability provided by the turbo becomes significant. Boost is achieved by the power generated by the turbine, which is proportional to the mass flow and the pressure ratio. This means that under significant boost conditions, the exhaust manifold pressure increases significantly as compared to a naturally aspirated engine, and the turbine, in-effect, acts as a significant restriction (i.e., exhaust throttling).

Figure 4:
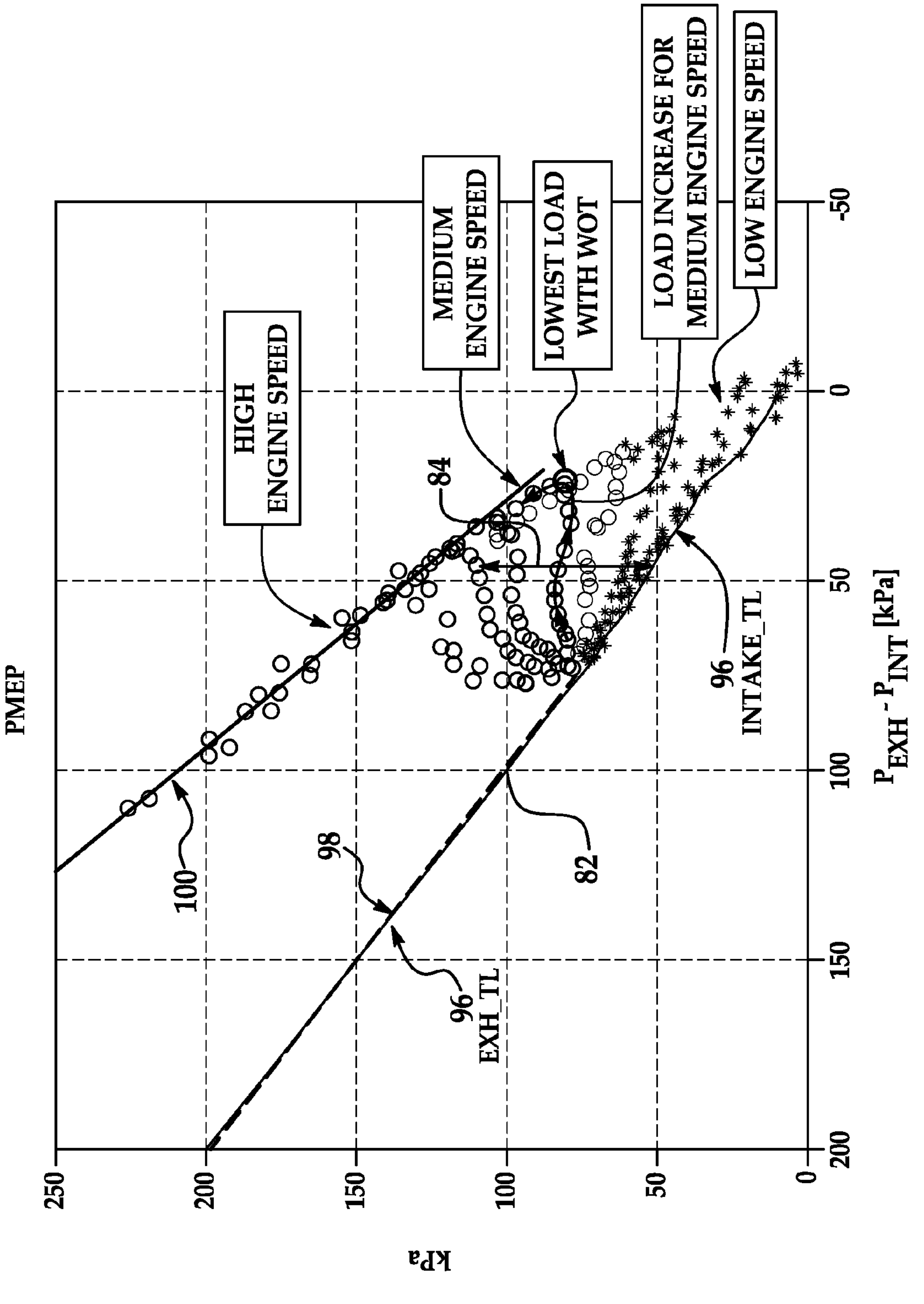
FIG. 4 is a chart showing pumping mean effective pressure (PMEP) values versus engine delta pressure, showing the relationship between throttling loss and valve flow loss contributions.

FIG. 4 shows, for a turbo-charged engine with an active waste-gate, the relationship between throttling loss and valve flow loss contributions to the total pumping work (PMEP). FIG. 4 shows data points for low engine speeds, medium engine speeds and high engine speeds. These are noted generally on the FIG. 4. Specifically, FIG. 4 shows that for medium engine speeds, the pumping work changes very little from low load to the lowest load with WOT, the latter also being noted directly on the FIG. 4. That is because the turbo charged engine essentially behaves as a naturally aspirated engine in this load region as described above. Further increases of the load causes both ($P_{exh}-P_{int}$) and PMEP to increase. This is the combined effect of increased valve flow loss due to the increasing engine flow and the increase in exhaust throttling loss. For example, one such path is illustrated for a medium engine speed, where the engine delta pressure decreases until the wide-open throttle (WOT) is reached, then increases for increasing load thereafter.

Figure 5:
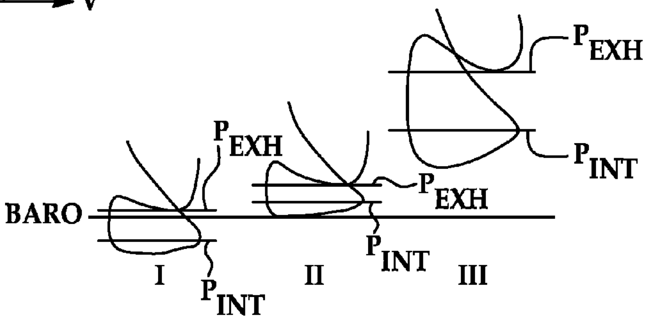
FIG. 5 is a series of simplified pumping loop diagrams for various engine speed and load combinations.

FIG. 5 illustrates a series of theoretical pumping loops for a turbo-charged engine with active waste-gate control. The pumping loop "I" shows that a low load is characterized by a large intake throttling loss and a relatively small valve flow loss. The pumping loop "II" shows that a medium load is characterized by a relatively low intake throttling loss due to WOT and an increased valve flow loss. Finally, the pumping loop "III" shows that a high load is characterized by a relatively high exhaust throttling loss due to the high exhaust back pressure needed to drive the turbine and a relatively high valve flow loss.

In view of this analysis, a number of candidate load dependencies were assessed relative to incurred pumping work (PMEP), for possible use in a pumping torque estimation model, namely, (1) $P_{exh}/P_{int}$; (2) $(P_{exh}/B_{aro})$^a/$(P_{int}/\text{Baro})$, where a=0.6 (a new VE load dependency); (3) Baro/MAP; (4) ($P_{exh}-P_{int}$); and (5) AIRLOAD. It was determined that AIRLOAD and Baro/MAP were practical load dependencies since they were both substantially monotonic. Volumetric efficiency (VE) is primarily dependent on MAP and less so on exhaust pressure. Therefore, the following analysis approximates that airflow (AIRLOAD) is directly proportional to MAP (constant VE). However, as the following will show neither candidate load dependency alone would be adequate, particularly when performance at altitude is considered.

Table 1 below sets conditions for two "load cases" to demonstrate this proposition. Test data (not shown) and Table 1 show that for both load cases. AIRLOAD is practically unchanged and that Baro/MAP decreases with altitude. Therefore, using AIRLOAD alone is equivalent to attributing all pumping work to be the result of valve flow loss and therefore will not properly compensate for altitude. Likewise, for the example in Case 2, the data show that the decrease in Baro/MAP due to altitude would cause the looked-up PMEP to increase more than reasonable because it would falsely include valve flow loss increase contribution due to the increased airflow associated with this pressure ratio at sea level.

TABLE 1

| | Case 1 | | Case 2 | |
|---|---|---|---|---|
| | @ Sea | @ Altd | @ Sea | @ Altd |
| Baro | 100 | 60 | 100 | 60 |
| MAP | 60 | 60 | 100 | 100 |
| Baro/MAP | 1.66 | 1 | 1 | 0.6 |
| AIRLOAD | approx. no change | | approx. no change | |

According to the invention, to properly comprehend the effects of both throttling loss (intake and exhaust) and valve flow loss, the inventive model for estimating pumping torque includes two constituent components, and is set forth below in equation (4):

$$\text{PMEP}=\text{Throttling\_Loss}\ (P_{exh}-P_{int})+\text{ValveFlow\_Loss}\ (\text{RPM, AIRLOAD}) \tag{4}$$

Referring again to FIG. 4, the relationship between the throttling loss contribution and the valve flow loss contribution is illustrated. The various data plotted represent the measured PMEP for a turbo-charged engine (active waste-gate). The trace 82 in FIG. 4 has been so designated because it represents the data contained in the throttling loss look-up table 82 shown in FIG. 1. The data and region labeled $96_{Intake\_TL}$ shows the PMEP for the lowest engine speed and reflects the contribution due to Intake Throttling Loss. The region labeled $96_{Exh\_TL}$, although an extrapolation (more below) of the measured PMEP data, reflects the contribution due to exhaust Throttling Loss (turbine restriction). Note that the gradient 98 of the trace 82, and the gradient 100 of the upper trace, while similar, is somewhat steeper in the boosted range (upper trace). Finally, the difference between the traces, designated as 1difference 84, corresponds to the data contained in the valve flow loss look-up table 84 shown in FIG. 1, and which is a function of engine speed and airload.

Based on the foregoing, a method will now be described to produce the first predetermined data contained in throttling loss look-up table 82 and the second predetermined data contained in valve flow loss look-up table 84. First, a test engine system is instrumented with pressure transducers and other hardware, along with a combustion analyzer configured to measure the PMEP data produced by the engine under test. Then, the measured PMEP data is recorded while the engine is controlled over a broad range of expected operating conditions (speed, load). To populate the throttling loss look-up table 82 (a two-dimensional table), the recorded PMEP for the lowest engine speed is identified (along with the engine delta pressure ($P_{exh}-P_{int}$) for that lowest speed). This identified PMEP point is then extrapolated for engine delta pressures ($P_{exh}-P_{int}$) larger than that measured at the lowest engine speed. The resulting trace 82 (FIG. 6) is then used to populate the data contained in the look-up table 82. Recorded PMEP values larger than that defined by the extrapolated trace 82 is considered to be the result of valve flow loss and such differences in value will be used to populate look-up table 84, as a function of engine speed (rpm) and airload (as defined above).

EXAMPLE

A turbo charged engine can, to an extent, at altitude recreate the same high boost and therefore load as sea level by closing the waste-gate and therefore increasing exhaust manifold pressure. The new model will properly increase the pumping loss estimate due to the increase in exhaust throttling (throttling loss table 82) while the valve flow loss contribution stays the same due to the same AIRLOAD (valve flow loss table 84).

It should be understood that electronic controller 14 as described above may include conventional processing apparatus known in the art, capable of executing pre-programmed instructions stored in an associated memory, all performing in accordance with the functionality described herein. That is, it is contemplated that the processes described herein will be programmed in a preferred embodiment, with the resulting software code being stored in the associated memory. Implementation of the present invention, in software, in view of the foregoing enabling description, would require no more than routine application of programming skills by one of ordinary skill in the art. Such an electronic controller may further be of the type having both ROM, RAM, a combination of non-volatile and volatile (modifiable) memory so that the software can be stored and yet allow storage and processing of dynamically produced data and/or signals.

It is to be understood that the above description is merely exemplary rather than limiting in nature, the invention being limited only by the appended claims. Various modifications and changes may be made thereto by one of ordinary skill in the art, which embody the principles of the invention and fall within the spirit and scope thereof.

The invention claimed is:

1. A method of determining a pumping torque of an internal combustion engine having a predetermined air induction configuration, comprising the steps of:

determining an engine speed, an engine delta pressure, and a relative engine airload;

calculating a first contribution based on the engine delta pressure using first predetermined data, the first contribution corresponding to throttling loss;

calculating a second contribution based on the engine speed and the engine airload using second predetermined data, the second contribution corresponding to valve flow loss; and determining a pumping torque based on the first and second contributions.

2. The method of claim 1 wherein said step of determining engine delta pressure comprises the substeps of:

determining an air intake pressure ($P_{int}$);

determining an exhaust pressure ($P_{exh}$);

determining a difference between the intake and exhaust pressures ($P_{exh}-P_{int}$).

3. The method of claim 1 wherein said step of determining the engine airload comprises the substeps of:

determining a reference cylinder air mass taken at a predetermined volumetric efficiency (VE), predetermined intake pressure and predetermined temperature;

determining an actual cylinder air mass; and dividing the actual cylinder air mass by the reference cylinder air mass to obtain the engine airload (%).

4. The method of claim 1 said step of determining the first contribution includes the substep of:

obtaining a first pumping mean effective pressure (PMEP) value from a first data structure containing the first predetermined data based on the engine pressure delta.

5. The method of claim 4 wherein said step of determining the second contribution includes the substep of:

obtaining a second pumping mean effective pressure (PMEP) value from a second data structure containing the second predetermined data based on the engine speed and the engine airload.

6. The method of claim 5 wherein said step of determining the pumping torque includes the sub-steps of:

summing the first and second PMEP values to obtain an aggregate PMEP value; and multiplying the aggregate PMEP value by a predetermined conversion factor to obtain the pumping torque.

7. The method of claim 6 wherein the predetermined conversion factor corresponds to $V_{eng}/4*\pi$ where $V_{eng}$ is the total displacement volume of the engine.

8. A method of controlling an internal combustion engine having a predetermined air induction configuration, comprising the steps of:

determining an engine speed, an engine delta pressure, and a relative engine airload;

calculating a first contribution based on the engine delta pressure using first predetermined data, the first contribution corresponding to throttling loss;

calculating a second contribution based on the engine speed and the engine airload using second predetermined data, the second contribution corresponding to valve flow loss;

determining a pumping torque based on the first and second contributions; and controlling the engine based on the determined pumping torque.

9. The method of claim 8 wherein said step of determining engine delta pressure comprises the substeps of:

determining an air intake pressure ($P_{int}$);

determining an exhaust pressure ($P_{exh}$);

determining a difference between the intake and exhaust pressures ($P_{exh}-P_{int}$).

10. The method of claim 8 wherein said step of determining the engine airload comprises the substeps of:

determining a reference cylinder air mass taken at a predetermined volumetric efficiency (VE), predetermined intake pressure and predetermined temperature;

determining an actual cylinder air mass; and dividing the actual cylinder air mass by the reference cylinder air mass to obtain the engine airload (%).

11. The method of claim 8 said step of determining the first contribution includes the substep of:

obtaining a first pumping mean effective pressure (PMEP) value from a first data structure containing the first predetermined data based on the engine pressure delta.

12. The method of claim 11 wherein said step of determining the second contribution includes the substep of:

obtaining a second pumping mean effective pressure (PMEP) value from a second data structure containing the second predetermined data based on the engine speed and the engine airload.

13. The method of claim 12 wherein said step of determining the pumping torque includes the sub-steps of:

summing the first and second PMEP values to obtain an aggregate PMEP value; and multiplying the aggregate PMEP value by a predetermined conversion factor to obtain the pumping torque.

14. The method of claim 13 wherein the predetermined conversion factor corresponds to $V_{eng}/4*\pi$ where $V_{eng}$ is the total displacement volume of the engine.

* * * * *